United States Patent
Rizk et al.

(10) Patent No.: US 8,919,714 B2
(45) Date of Patent: Dec. 30, 2014

(54) COMPLIANT TOOL HOLDER

(75) Inventors: Nabil Michael Rizk, Pittsburgh, PA (US); Frank F. Campagna, Mars, PA (US); Aaron P. Nicely, West Mifflin, PA (US); Joseph J. Vasalani, III, McKees Rocks, PA (US)

(73) Assignee: RE2, Inc., Pittsburgh, PA (US)

( * ) Notice: Subject to any disclaimer, the term of this patent is extended or adjusted under 35 U.S.C. 154(b) by 293 days.

(21) Appl. No.: 13/272,854

(22) Filed: Oct. 13, 2011

(65) Prior Publication Data

US 2012/0091311 A1     Apr. 19, 2012

Related U.S. Application Data

(60) Provisional application No. 61/392,662, filed on Oct. 13, 2010.

(51) Int. Cl.
| *A47B 96/06* | (2006.01) |
| *E04G 3/00* | (2006.01) |
| *F16B 1/00* | (2006.01) |
| *G09F 7/18* | (2006.01) |

(52) U.S. Cl.
USPC .......... 248/228.6; 248/228.5; 248/560; 248/634; 901/30; 901/31; 901/39

(58) Field of Classification Search
USPC ........... 294/86.4; 901/30, 31, 39; 700/258; 248/560, 615, 634, 226.11, 228.5, 248/228.6
See application file for complete search history.

(56) References Cited

U.S. PATENT DOCUMENTS

| 3,824,674 | A | * | 7/1974 | Inoyama et al. ........... 29/407.05 |
| 4,636,135 | A | * | 1/1987 | Bancon ........................ 414/730 |
| 4,797,564 | A | | 1/1989 | Ramunas |
| 4,830,565 | A | * | 5/1989 | Bucher et al. ........... 414/416.01 |
| 4,883,939 | A | | 11/1989 | Sagi |
| 4,913,617 | A | | 4/1990 | Nicholson |
| 5,020,964 | A | | 6/1991 | Hyatt et al. |
| 5,044,063 | A | | 9/1991 | Voellmer |
| 5,223,964 | A | | 6/1993 | Nagano et al. |
| 6,408,531 | B1 | | 6/2002 | Schimmels |
| 2014/0052295 | A1 | * | 2/2014 | Eakins et al. ................ 700/258 |

FOREIGN PATENT DOCUMENTS

| EP | 0430467 A1 | 6/1991 |
| WO | 8801555 A1 | 3/1988 |
| WO | 9106403 A1 | 5/1991 |
| WO | 2011019742 A1 | 2/2011 |

* cited by examiner

*Primary Examiner* — Amy J Sterling
(74) *Attorney, Agent, or Firm* — The Webb Law Firm

(57) ABSTRACT

A compliant tool holder is provided for use with robots, unmanned ground vehicles, and the like. The compliant tool holder is characterized in that it involves the use of means for compliance, such as springs, rubber, plastics, metals, composites, shock mounts, vibration mounts, or similar means for permitting compliant movement in three rotational and three translational degrees of freedom during end effector changes. The compliant tool holder reduces costs associated with automated tool change in the field, and allows for more rapid switching of end effectors, enabling a greater range of uses for robots and unmanned ground vehicles.

15 Claims, 8 Drawing Sheets

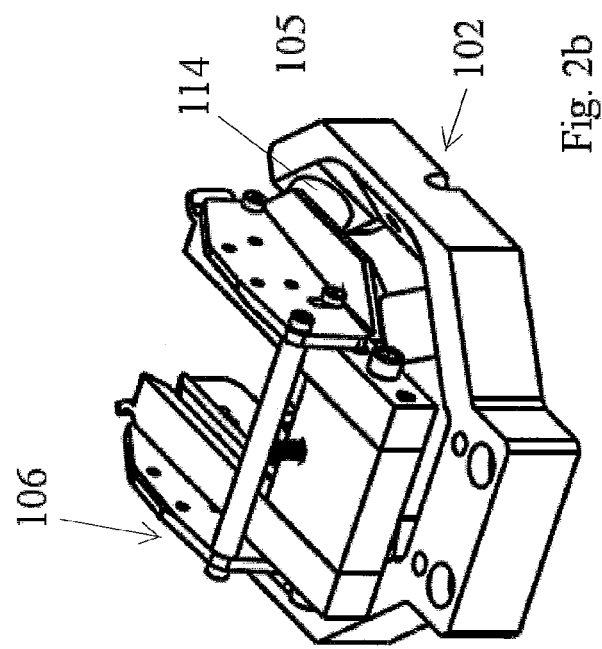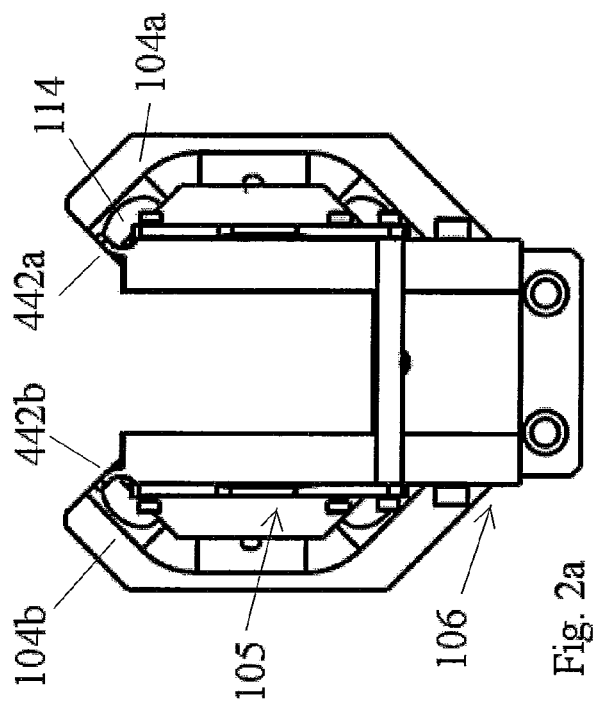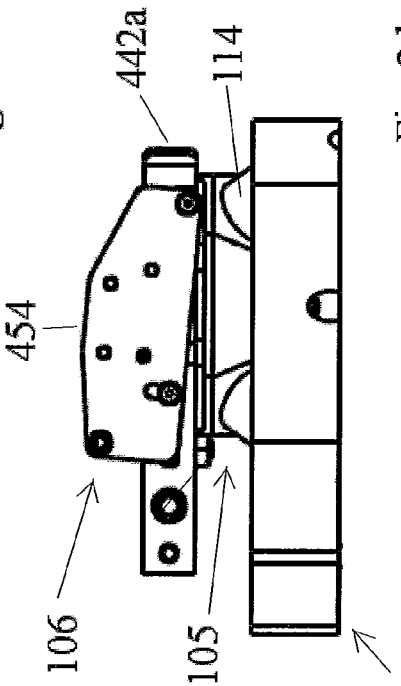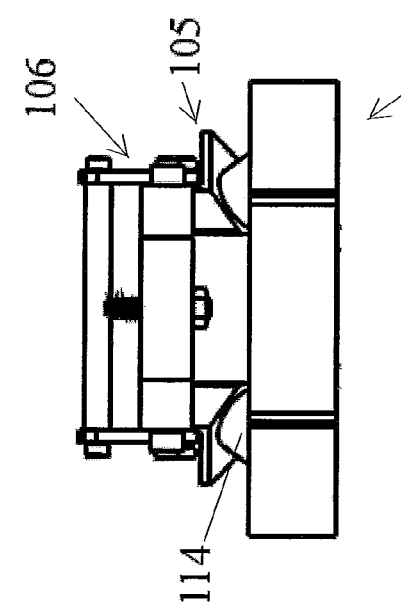

COMPLIANT TOOL HOLDER

CROSS REFERENCE TO RELATED APPLICATIONS

This application claims priority to U.S. Provisional Patent Application No. 61/392,662, filed Oct. 13, 2010, which is hereby incorporated by reference in its entirety.

BACKGROUND OF THE INVENTION

Field of the Invention

Manipulators on mobile robots require specialized end effectors in order to accomplish particular missions. Currently, deployed systems have end effectors designed, built, and installed at the factory. Factory installed tools can only be repaired or replaced in a factory. This limits the effectiveness of the robot to those missions which can be achieved with a single tool. Heretofore, when a new candidate task is identified, the typical response has been to design and build a new robot intended to perform the specific task. Sometimes existing unmanned ground vehicles (UGV) platforms are used, but just as often, a new robot is created to specifically address the task. This has resulted in a proliferation of small UGVs, each performing admirably on tasks within each of its subset of core competencies, but is generally unsuitable for tasks that vary too widely from its essential purpose. It is impractical to expect field teams to carry multiple UGVs, each suited for a specific task. In addition to the strain on the physical resources of the field team (e.g., transportation and maintenance), different robots come with different control schemes. This reduces the ability of the operator to capitalize on the experience and intuition gained from operating previous robots, because the operator cannot rely on the trained reflexes developed while controlling previous robots. In fact, these differing control schemes lead to operator errors and inefficient control.

Another approach has been to design new, more capable robots, but this approach has drawbacks because even if a robot were designed and built to perform all of the tasks currently assigned to UGVs, it would quickly become outdated as new tasks and jobs are identified. Additionally, external variables, such as physical environment, make UGVs designed for one environment wholly impractical for use in another environment, meaning a number of new robot types would need to be designed, tested, and built. Systems with replaceable end effectors are also ineffective because they require a technician and possibly a number of specialty tools. Generally, these changes would require a technician to remove the current tool and to attach its replacement. This may involve physically disconnecting the tool, disconnecting electrical connections, physically attaching the new tool, and hooking up its electrical connections. The system may also require reconfiguring the control software for each specialized tool. Particularly, in time critical applications, such as military or civilian Explosives Ordinance Disposal (EOD), this process is too slow and interferes with missions.

In addition, it takes a robust design to survive the normal working environment for such devices, both during deployment on the mobile robot and when the manipulator and tools are being stored or transported. Mechanical connections must be compliant to minor variations in manufacturing tolerances of mating components, or environmental tolerances which develop when a tool is dropped or bumped against another tool in the toolbox, or caused by the presence of debris, such as dirt and sand, captured from the working environment.

Robotic arms often require specialized configurations to accomplish their particular mission, requiring change in the length of a link in the arm or attaching a different end effector or tool. Different manipulator systems exhibit a wide range of force capacity, rigidity, accuracy and static friction.

Tools that attach to links of the robotic arm that are pivoting or rotating must be able to withstand the large bending movements and torques that result from this.

Despite the need for robotic arms to pivot and rotate, to date, tool holders have been rigidly attached to robot platforms, resulting in difficulties in attaching and changing end effectors on the robotic arm. The problems encountered with a rigid tool holder mount are numerous. They include limitations of accuracy of motion, calibration error, sensor drift, system structural flexibility, debris, wear, and damage. Different manipulator systems exhibit a wide range of manipulator properties. A combination of self-aligning features combined with tool holder compliance allows reliable tool change under a wide range of real-world conditions. Current tool holders, however, lack sufficient self-aligning features.

For example, in WO 2011/019742, the tool holder (item 4) is attached to a tool station that is securely and rigidly attached to a surface via the block (item 410 of FIG. 19B). Because it is rigidly attached to the surface of the robot, compliance is limited to the degree of translational movement of the arm, which can be imprecise based on the number of joints and the amount of wear in those joints. The resulting process of attaching and disengaging end effectors is time-consuming and must be done with fine precision. This time consumption is not optimal for use in, for example, EOD.

The limitations of the existing art are obvious. Limited movement possibilities of the tool holder (i.e., in one plane only) combined with limited self-aligning features of the assembly, reliant on the ability of the arm to change planes and angles, make end effector interchange in the field tedious and hazardous.

In addition to the associated danger, the limited range of movement of prior tool holder assemblies results in increased cost of production. Robotic arms with rigidly attached tool holder assemblies must be equipped with another means of allowing for attachment and detachment of end effectors. Typically this would be accomplished through the use of numerous cameras for alignment by the end user; however, attachment of multiple cameras increases cost, and such cameras may not be useful in certain real-world scenarios due to weather or other uncontrollable conditions.

A further solution to the problem of limited tool holder compliance may be the use of multiple sensors placed on the robotic arm and the tool holder itself for feedback alignment. Again, however, this method is expensive, and the wear from subsequent use limits the effectiveness of this solution. Further, as with multiple cameras for end-user alignment, uncontrollable conditions may limit the effectiveness of this solution.

Yet another solution to the issue of limited tool holder compliance may be to introduce compliance into the robotic arm itself. This solution is not desirable, as incorporating this freedom into the robotic arm results in increased weight on the arm, increasing forces on the various joints. This increased force results in a need for greater strength in the joints, further increasing the weight of the robot or UGV. Further, with robotic arms of greater length, increased weight at the distal end increases concerns related to leverage. Thus, introducing compliance into the arm itself is not optimal.

Thus, it is an object of the present invention to provide a compliance system for a tool holder which overcomes these deficits in the prior art, by allowing movement of the tool holder in six degrees of freedom. The compliant tool holder system of the present invention allows for different levels of deflection of the tool holder based on the force applied by the robotic arm and end effector as attachment or detachment takes place. The compliant tool holder has stiffness tailored to the three translational degrees of freedom, tilt and yaw rotational degrees of freedom, and rotational degree of freedom about the axis of the tool of the end effector. The tool holder is mounted to a base using means for compliantly mounting tool holder components together, such as springs or the like. A base is rigidly mounted to the structure of the robot, UGV, or guided machine. However, the compliant mounts restrain the tool holder in all degrees of freedom while permitting deflection proportional to the force applied, allowing for self-alignment and greater ease of end effector exchange.

SUMMARY OF THE INVENTION

The current invention provides a compliant tool holder for automatically engaging and separating robotic end effectors from their manipulator arms during deployment, thus allowing unhindered integration of end effectors. The compliant tool holder includes a lower tool base, and upper tool base, means for compliance, and a tool station. The means for compliance are positioned between the upper tool base and a lower tool base, so that the upper tool base and tool station may move in three translational degrees of freedom and three rotational degrees of freedom during end effector attachment and detachment. This movement allows for more rapid end effector changes.

The current invention also provides for a compliant tool holder, including a lower base, means for compliance, upper base, and tool station that is formed as one integral piece. The invention further provides for a compliant tool holder wherein the tool station and upper tool base are one integral component, removably attached to the lower tool base via the means for compliance. Means for compliance may be removably attached to the upper tool base and lower tool base by a plurality of fasteners, or they may also be integral to the lower tool base and upper tool base. The compliant tool station may be attached to a robot, guided machine, or unmanned vehicle.

BRIEF DESCRIPTION OF THE DRAWINGS

FIG. 2a illustrates a top-perspective view of the tool holder assembly of the present invention;

FIG. 2b illustrates a side-perspective view of the tool holder assembly of the present invention;

FIG. 2c illustrates a front-perspective view of the tool holder assembly of the present invention;

FIG. 2d illustrates a side-perspective view of the tool holder assembly of the present invention;

DESCRIPTION OF THE PREFERRED EMBODIMENTS

The following description is merely exemplary in nature and is in no way intended to limit the invention, its application, or uses.

An object of the present invention is to provide a compliant tool holder for automatically engaging and separating robotic end effectors from their manipulator arms during deployment, thus allowing unhindered integration of end effectors.

The tool holder assembly can provide a platform to engage a first and second light-weight mechanical joint member for automated coupling. The joint members provide a rigid connection, for connecting an end effector to a robotic manipulator. End effectors for attaching using an automated tool change assembly can include components such as a retrievable delivery device, gamble grip, dozer, shovel, tilting tools, plow, drills, saws, cutters, grinders, sensors, camera, disrupter, arm extenders, arm linkages, digging tools, and pan-tilt table. One skilled in the art will recognize this list is not exhaustive and the use of other types of robot components with the compliant tool holder of the present invention is possible.

Figure 1:
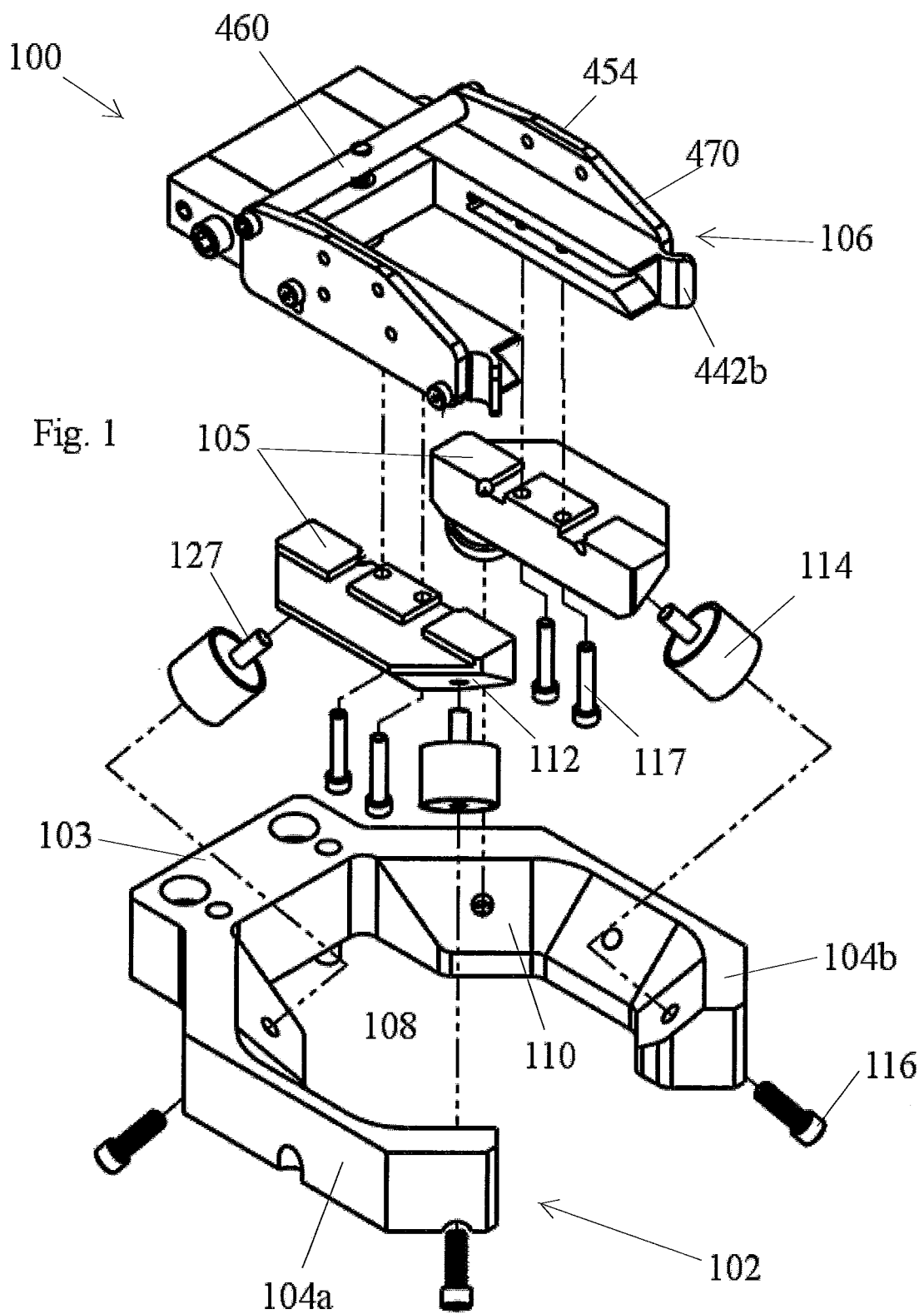
FIG. 1 illustrates an exploded view of the tool holder assembly of the present invention.

With reference to FIG. 1, a tool holder assembly 100 can have a lower tool base 102, upper tool base 105, means for compliance 114 positioned between the lower tool base 102 and upper tool base 105, and a tool station 106. The lower tool base 102 and upper tool base 105 may each be comprised of a plurality of parallel arms. The lower tool base 102 can be a hollow member forming cavity 108 about the center and providing a beveled surface 110 on an inner surface surrounding cavity 108. The tool holder 100 may be formed out of any suitable material, including but not limited to, Aflas, Buna-N, Butyl, ECH, EPDM, EVA, gum, Ionomer, latex, neoprene, polyethylene foam, polyethylene rubber, polyimide, polyurethane, santoprene, SBR, silicone, vinyl, and Viton® Flouroelastomer. The material may also be a plastics such as ABS, acetal copolymer, acetate, cast acrylic, extruded acrylic, butyrate, Cirlex Polyimide, CTFE, Delrin® Acetal resin, FEP, HDPE Polyethylene, Hydex, Kapton® Polyimide, LDPE polyethylene, polyphenyl oxide, nylon, PEEK, PETG, PFA, polycarbonate, polyester, polypropylene, polystyrene, polysulfone, PPS, PTFE, PVC, PVDF, Radel, Rulon, Teflon® PTFE, polyamide-imide, Tucrite, UHMW polyethylene, VHMW polyethylene, polyetherimide, and Vespel® polyimide. The tool holder 100 may also be injection-molded plastic or metals such as steel, stainless steel, steel cable, stainless steel cable, titanium, aluminum, or may be composite materials containing fiberglass, carbon fiber, Kevlar, or aramid fibers. These materials provide sufficient flexibility, or give, to provide compliance to the tool holder assembly 100 during the process of a robotic arm connecting with or decoupling from an end effector. Any number of compliant tool holders 100 can be used on a robot or UGV, depending on the space available on the robot.

In a preferred nonlimiting embodiment, the tool holder assembly 100 is formed as a single integrated component, comprising sections corresponding to a lower tool base 102, upper tool base 105, means for compliance 114, and tool station 106.

In a preferred nonlimiting embodiment, the lower tool base 102 is substantially u-shaped, having a plurality of parallel arms 104a-104b integral with an end portion 103.

In another preferred nonlimiting embodiment, the lower tool base 102 is substantially c-shaped. The parallel arms 104a-104b and the end portion 103 have a beveled surface 110 on the surface facing the cavity 108. The portions of the arms 104a-104b distal to the end portion 103 of the lower base 102 are angled towards each other. In a preferred nonlimiting embodiment, the beveled surface 110 is at a 45 degree angle relative to the flat top of the lower tool base 102.

With continued reference to FIG. 1, an upper tool base 105 is attached to the lower tool base 102. In a preferred nonlimiting embodiment, the upper tool base 105 includes a beveled surface 112 formed about the exterior of the upper tool base 105. The beveled surface 112 can be coincident with the beveled surface 110 of the lower tool base 102.

In yet another nonlimiting embodiment, the upper tool base 105 may be a single piece, having a plurality of parallel arms integral with an end portion. In this nonlimiting embodiment, the end portion and the arms may be beveled to be coincident to, and form a complementary angle with, the beveled surface 110 of the lower tool base 102.

In a further nonlimiting embodiment, the upper tool base 105 and the tool station 106 may be a single integrated component, wherein the means for compliance 114 are positioned between the lower tool base 102 and the integrated component.

With continued reference to FIG. 1, means for compliance 114 are positioned between the lower tool base 102 and the upper tool base 105. In a preferred nonlimiting embodiment, the means for compliance 114 are positioned between the beveled surface 110 of the lower tool base 102 and the beveled surface 112 of the upper tool base 105. The means for compliance 114 can be attached using any type of fasteners 116 connected through the lower tool base 102 through the means for compliance 114, and received by the upper tool base 105. The fasteners 116 may be screws, pins, pegs, or the like. The fasteners 116 removably attach the lower tool base 102 to the means for compliance 114 and upper tool base 105. The invention is not limited to one particular fastener, as one skilled in the art could use other fasteners to form a connection between the lower tool base 102, upper tool base 105, and means for compliance 114. In a preferred nonlimiting embodiment, the means for compliance 114 have one or more integrated studs 127 for attachment to the upper tool base 105 and/or lower tool base 102. In yet another preferred nonlimiting embodiment, the means for compliance 114 have an opening through the center that is threaded so that attachment of the means for compliance 114 to the lower tool base 102 and upper tool base 105 may be accomplished by a screw fastener.

In a preferred nonlimiting embodiment, the means for compliance 114 are integral with the lower tool base 102 and upper tool base 105, eliminating the need for fasteners 116.

Upper tool base 105 can be attached to the tool station 106 using fasteners 117 received in the upper tool base 105 into a receptacle in the bottom of the tool station 106. The invention is not limited to one particular fastener, as one skilled in the art could use other fasteners to form a connection. Additionally, upper tool base 105 and tool station 106 may be a single integral piece. When assembled, the means for compliance 114, formed of a flexible material, act to support movement of the upper tool base 105 relative to the lower tool base 102. In a preferred nonlimiting embodiment, the number of means for compliance suitable for achieving desired movement in the translational and rotational degrees of freedom may be from 3-6, with 4 being a preferred number of mounting means. In addition, force applied to the tool station 106 during attachment and detachment of end effectors can be passed through to the means for compliance 114. Thus, the tool station 106 and upper tool base 105 may move relative to the lower tool base 102, which is rigidly mounted to the body of a robot.

In a preferred nonlimiting embodiment, the means for compliance 114 may be shock mounts, vibration mounts, air springs, gas springs, resilient stoppers, wire rope isolator mounts, or the like. The means for compliance 114 may be formed of a compliant material, for example, rubbers such as Aflas, Buna-N, Butyl, ECH, EPDM, EVA, gum, Ionomer, latex, neoprene, polyethylene foam, polyethylene rubber, polyimide, polyurethane, santoprene, SBR, silicone, vinyl, and Viton® Flouroelastomer. The material may also be a plastics such as ABS, acetal copolymer, acetate, cast acrylic, extruded acrylic, butyrate, Cirlex Polyimide, CTFE, Delrin® Acetal resin, FEP, HDPE Polyethylene, Hydex, Kapton® Polyimide, LDPE polyethylene, polyphenyl oxide, nylon, PEEK, PETG, PFA, polycarbonate, polyester, polypropylene, polystyrene, polysulfone, PPS, PTFE, PVC, PVDF, Radel, Rulon, Teflon® PTFE, polyamide-imide, Tucrite, UHMW polyethylene, VHMW polyethylene, polyetherimide, and Vespel® polyimide. The means for compliance 114 may also be injection-molded plastic or metals, such as steel, stainless steel, steel cable, stainless steel cable, titanium, aluminum, or may be composite materials containing fiberglass, carbon fiber, Kevlar, or aramid fibers.

With reference to FIG. 2a, an upper view of the tool holder assembly 100 shows the lower tool base 102 and the upper tool base 105 in the assembled position. Tool station 106 is attached to the upper tool base 105. With reference to FIG. 2b, the assembled tool holder is shown with the means for compliance 114 positioned between the lower tool base 102 and upper tool base 105. With reference to FIG. 2c, means for compliance 114 are shown positioned between the lower tool base 102 and upper tool base 105, the upper tool base 105 being rigidly attached to the tool station 106. FIG. 2d is a side view of the tool holder assembly 100 showing the tool station 106 attached to the lower tool base 102 attached thereto via the means for compliance 114 attached to the upper tool base 105.

With reference to FIGS. 2a-d, means for compliance 114 are positioned between upper tool base 105 and lower tool base 102, allowing upper tool base 105, with tool station 106 firmly attached or integral thereto, to move freely in proportion to the force applied by the robotic arm (not shown) attaching to or detaching from an end effector (not shown) stored in the tool station.

Figure 3:
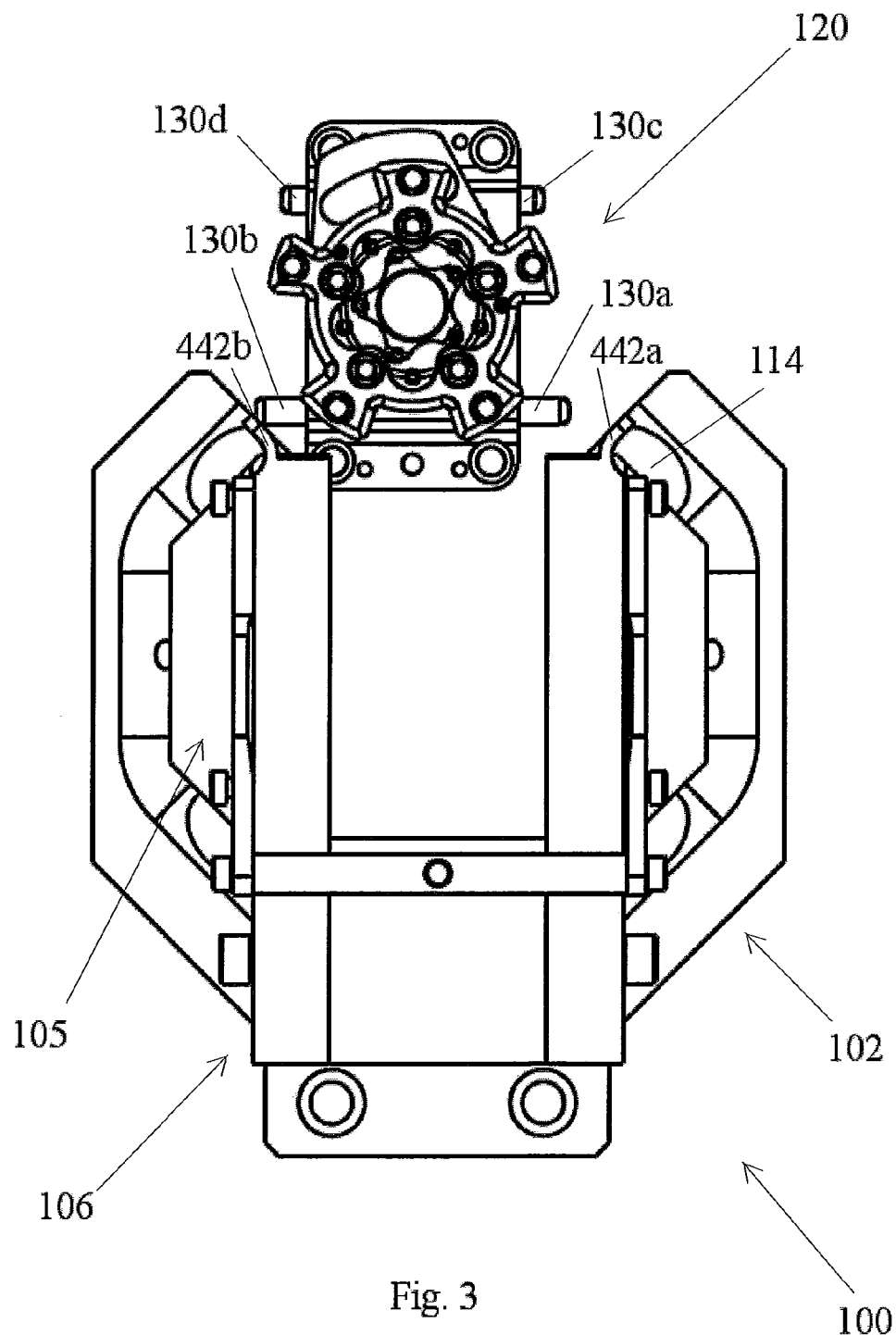
FIG. 3 illustrates a top-perspective view of the tool holder assembly and a robotic end effector.

With reference to FIG. 3, a tool base assembly 120 of the end effector (not shown) attached to a manipulator (not shown) is seen positioned proximate to the tool holder assembly 100. The robotic arm (not shown) moves the end effector into position for detachment utilizing the multiple joints. However the robotic arm can only move in limited degrees of freedom; it may rotate relative to the base on which it sits (not shown), and the joints allow movement through two translational degrees of freedom. As the arm maneuvers the end effector into position, the guiding mechanisms of the tool base assembly, which can be pins 130a-b or guide plates must engage with the optional guides 442a-442b to be guided to the track of the tool station 106. The ramped surfaces (not shown) act as ramps with respect to pins 130a-130b of tool base assembly 120 of an end effector (not shown), guiding the tool base assembly 120 of the end effector into engagement with the tool station 106 as the robotic arm (not shown) lowers the tool base assembly 120 of the end effector into the tool station 106.

Figure 6:
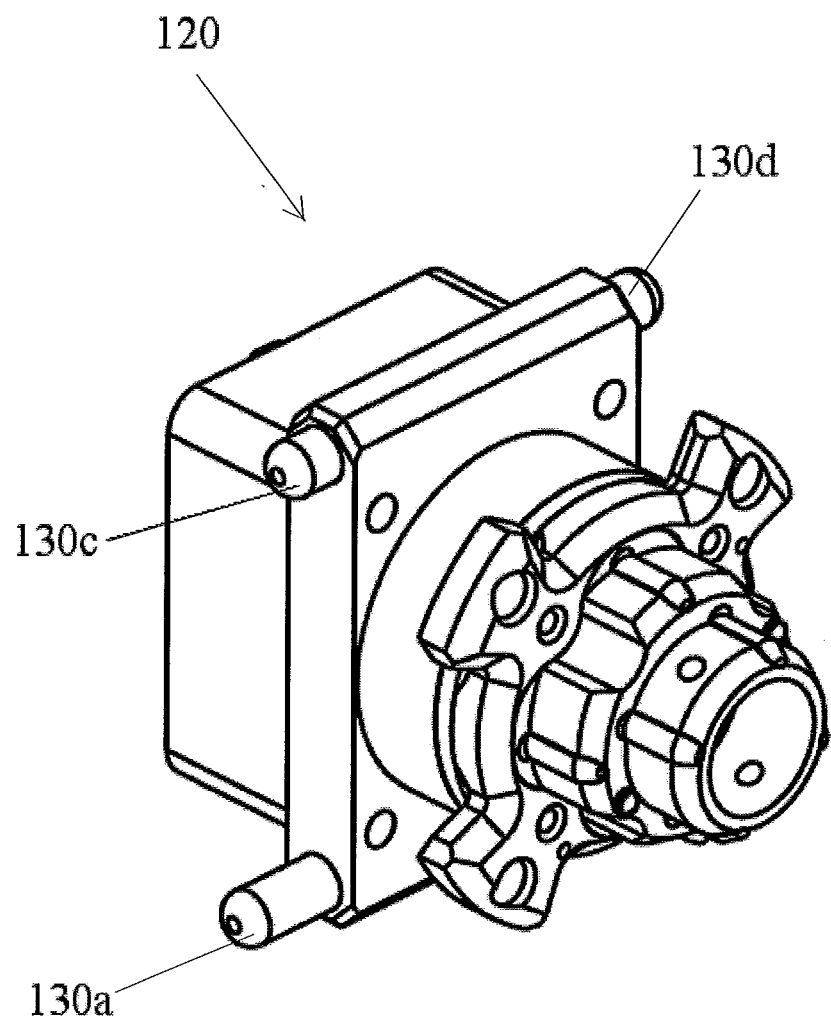
FIG. 6 illustrates a side-perspective view illustrating an end effector for use with the tool holder assembly of the present invention.

With reference to FIG. 6, a tool base assembly 120 of an end effector is shown with pins 130a, 130c, 130d (pin 130b is hidden behind the tool base assembly 120). The pins guide the end effector into the tool station 106 during detachment (described previously), and allow interaction of the end effector, and thus the robotic arm, with the tool station 106. Force applied by the arm, through the end effector, moves the tool station 106 and upper tool base 105 in translational and rotational degrees of freedom. Any type of tool base assembly 120 may be utilized with the compliant tool holder assembly of the present invention, including assemblies that lack pins and utilize guide plates.

Figure 7:
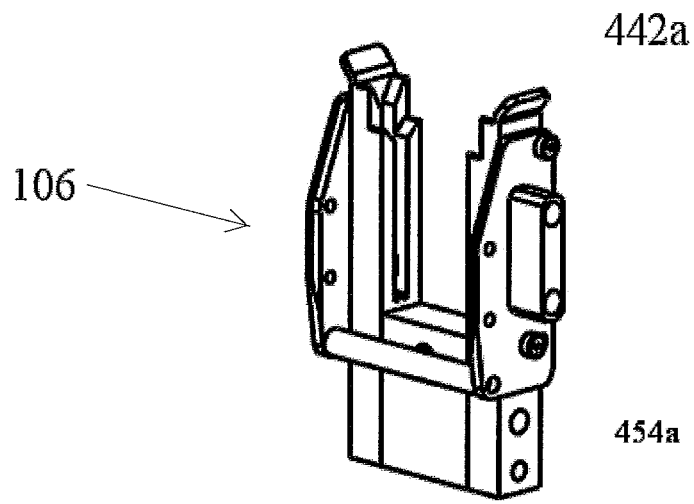
FIG. 7 illustrates a side-perspective view of the tool station of the tool holder assembly of the present invention.

With reference to FIG. 7, an exemplary tool station 106 for engaging end effectors (not shown) is shown. The tool station 106 serves the function of holding the tools when not in use by a robotic arm or manipulator. In addition, tool station 106 can provide correct positioning for tool base assembly 120 of an end effector during engagement. The tool station 106 can also compliantly interact with the tool base assembly 120 of an end effector for disengagement.

Figure 8:
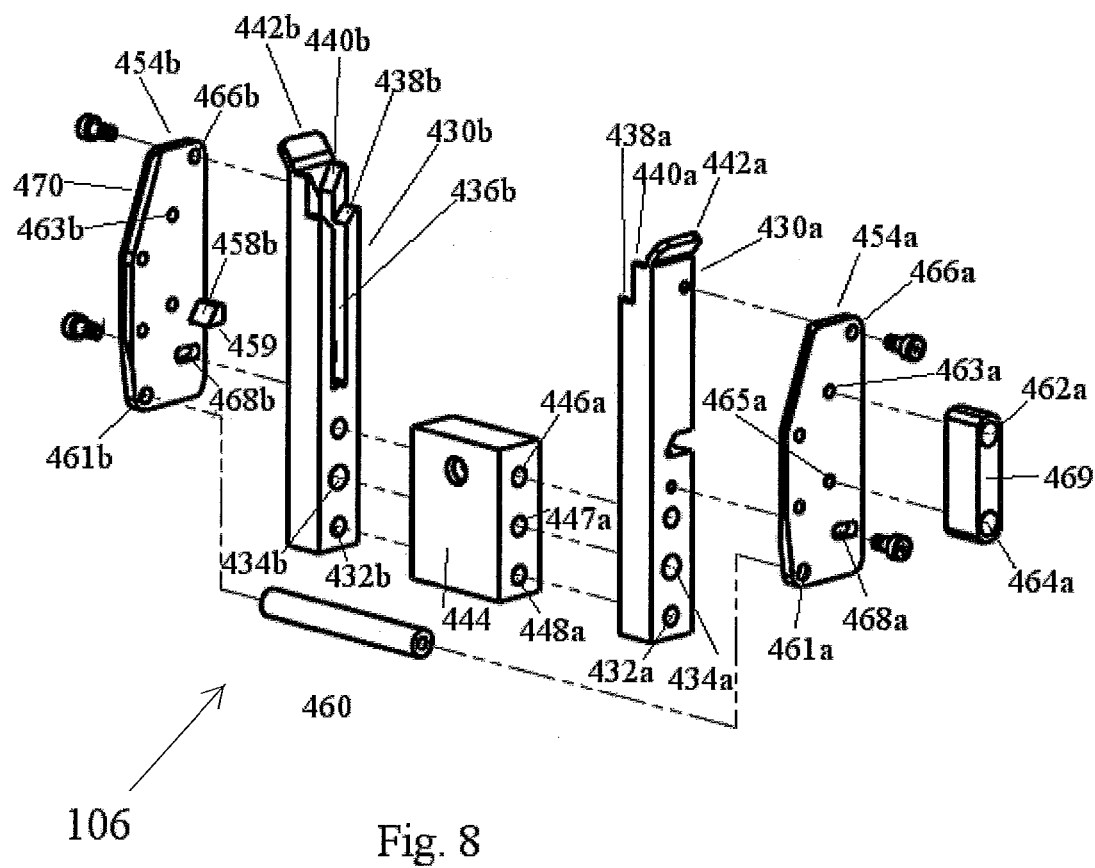
FIG. 8 illustrates an exploded view of the tool station for use with the tool holder assembly of the present invention.

With reference to FIG. 8, an exploded image of the exemplary tool station 106 is shown. Tool station 106 can have arms 430a-430b, having holes 432a-432b, 434a-434b for connecting arms 430a-430b with block 444. Arms 430a-430b can further have a two-stage track 436a-436b. Track 436a-436b has ramped surfaces 438a-438b formed on an outer surface of ramps 440a-440b. The ramped surfaces 438a-438b act as ramps with respect to pins 130a-130b of tool base assembly 120 of an end effector (not shown), guiding the tool base assembly 120 into engagement with the tool station 106 as the robotic arm (not shown) lowers the tool base assembly 120 into the tool station 106 (see FIG. 3-6). Optional guides 442a-442b provide for lateral alignment of the lower pins 130a 130b with the tool station 106. Block 444 includes holes 446a-446b, 447a-447b, 448a-448b holding the arms 430a-430b together.

With continuing reference to FIG. 8, plates 454a-454b are provided having a striker 458a (not shown) and 458b positioned on an internal surface extending outward having a ramped surface 459 on one side thereof. The plates 454a-454b can be attached by a hollow cylindrical bar 460 coupled to holes 461a-461b. The plates 454a-454b can also have a manual release 469 attached with holes 462a and 464a to holes 463a-463b, respectively. Holes 466a-466b and 468a-468b are provided for fastening plates 454a-454b to the arms 430a-430b.

To briefly describe the usual process of end effector disengagement, the wrist assembly of a robotic arm (not shown) is driven electronically (or by manual placement) onto the tool station 106. This movement causes the slanted face 470 of the plates 454a-454b to contact the locking collar of the robotic wrist (not shown). Moving the locking collar onto slanted face of plates 454a-454b when the collar is locked, forces the collar to open, causing the pins (not shown) of the locking collar to move out of a lock ring (not shown) and lock plate (not shown). The pins 130a 130d of the tool base assembly 120 slide onto the ramped surfaces 438a-438b. The ramped surfaces 438a-438b guide the pins into the two-stage tracks 436a-b. The lower pins move along the tracks 436a-436b. Rotational freedom about the axis of pins 130a-130b facilitates placement of the tool on tool station 106. Contacting the striker 458b, pins 130a-130b cause the striker to open, allowing the pins to enter further tracks 436a-436b, moving the upper pins 130c 130d further onto the ramp, placing the lower pins in a position adjacent the lock ramps, and guiding them into the tracks 436a-436b. When the pins 130c-130d have entered the tracks 436a-436b, all degrees of freedom are restricted. With release of pins (not shown), the wrist assembly of the robotic arm (not shown) can be rotated, automatically or manually. The wrist assembly of the robotic arm (not shown) is rotated automatically using a motor inside the wrist assembly. The locking collar (not shown) is blocked by a follower ring (not shown). The striker 458b is closed, locking the tool base assembly 120 of the end effector into place. The wrist assembly (not shown) is disconnected.

With reference to FIG. 3, the position of the tool base assembly 120 of the end effector is slightly off-center in relation to tool holder assembly 100. Compliance will be needed therebetween as the tool base assembly 120 of the end effector engages with the tool holder assembly 100 via interaction with the tool station 106. As the tool base assembly 120 of the end effector is forced into the tool holder assembly 100, the means for compliance 114 attached to the upper tool base 105 will provide compliance to the tool station 106 which is attached to the upper tool base 105. After the tool base assembly 120 of the end effector has disengaged from the wrist assembly (not shown), resistance from the means for compliance 114 will return the upper tool base 105 and tool station 106 to a set position. Uniform movement of the tool station 106 with relationship to the tool base assembly 120 of the end effector as the means for compliance 114 each are temporarily altered in shape, provides an additional motion. The tool holder assembly 100 provides compliance along six degrees of freedom.

With continuing reference to FIG. 3, the tool base assembly 120 of the end effector engages the tool holder assembly 100 via the tool station 106 only if the tool station is compliant in the plane of yaw rotational movement. In the present invention, the means for compliance 114 provide freedom of rotation to the upper tool base 105 and tool station 106 to account for the slight change in alignment of the tool base assembly 120 of the end effector during engagement.

Figure 4:
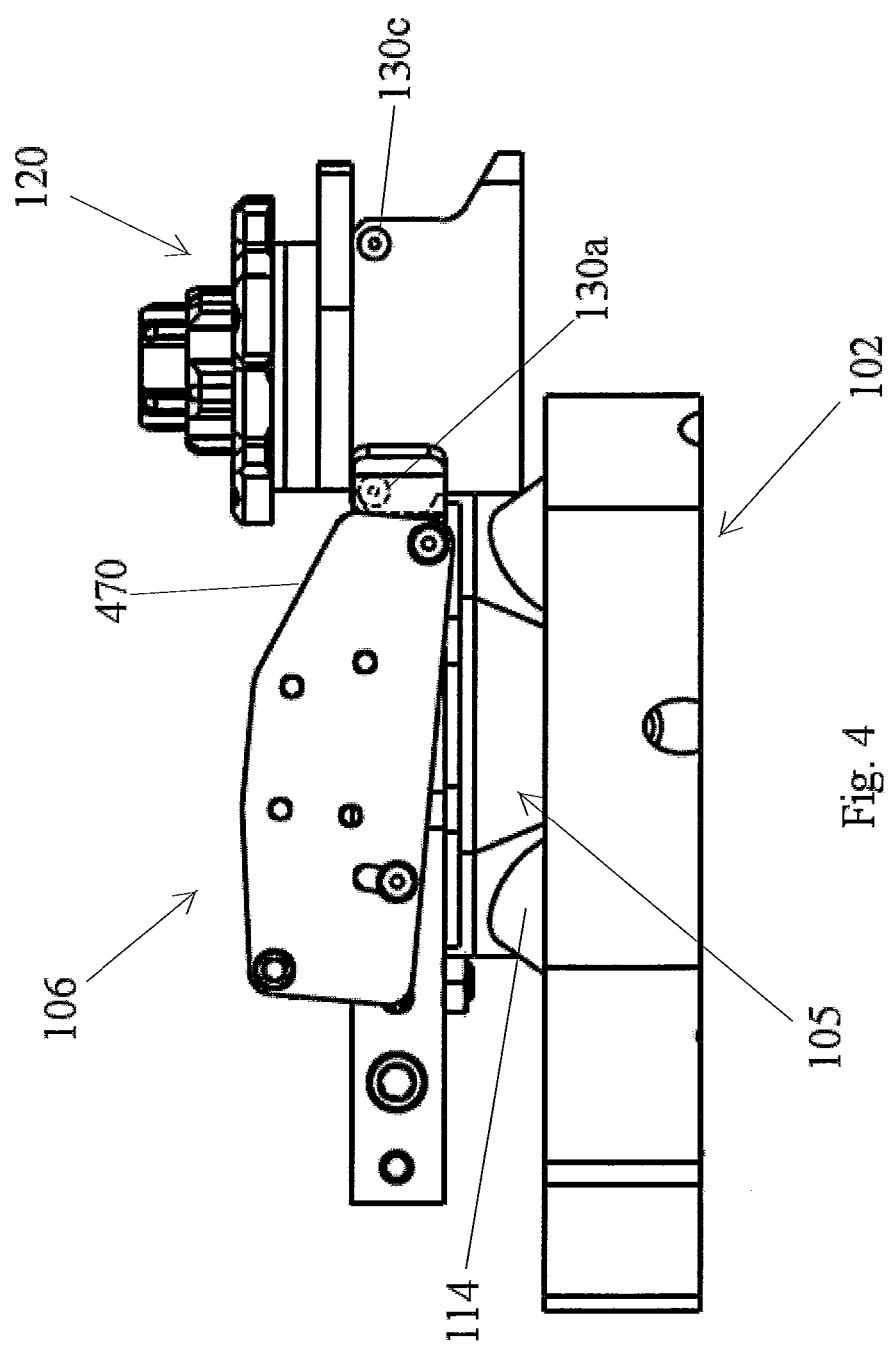
FIG. 4 illustrates a side-perspective view of the tool holder assembly receiving an end effector.
Figure 5:
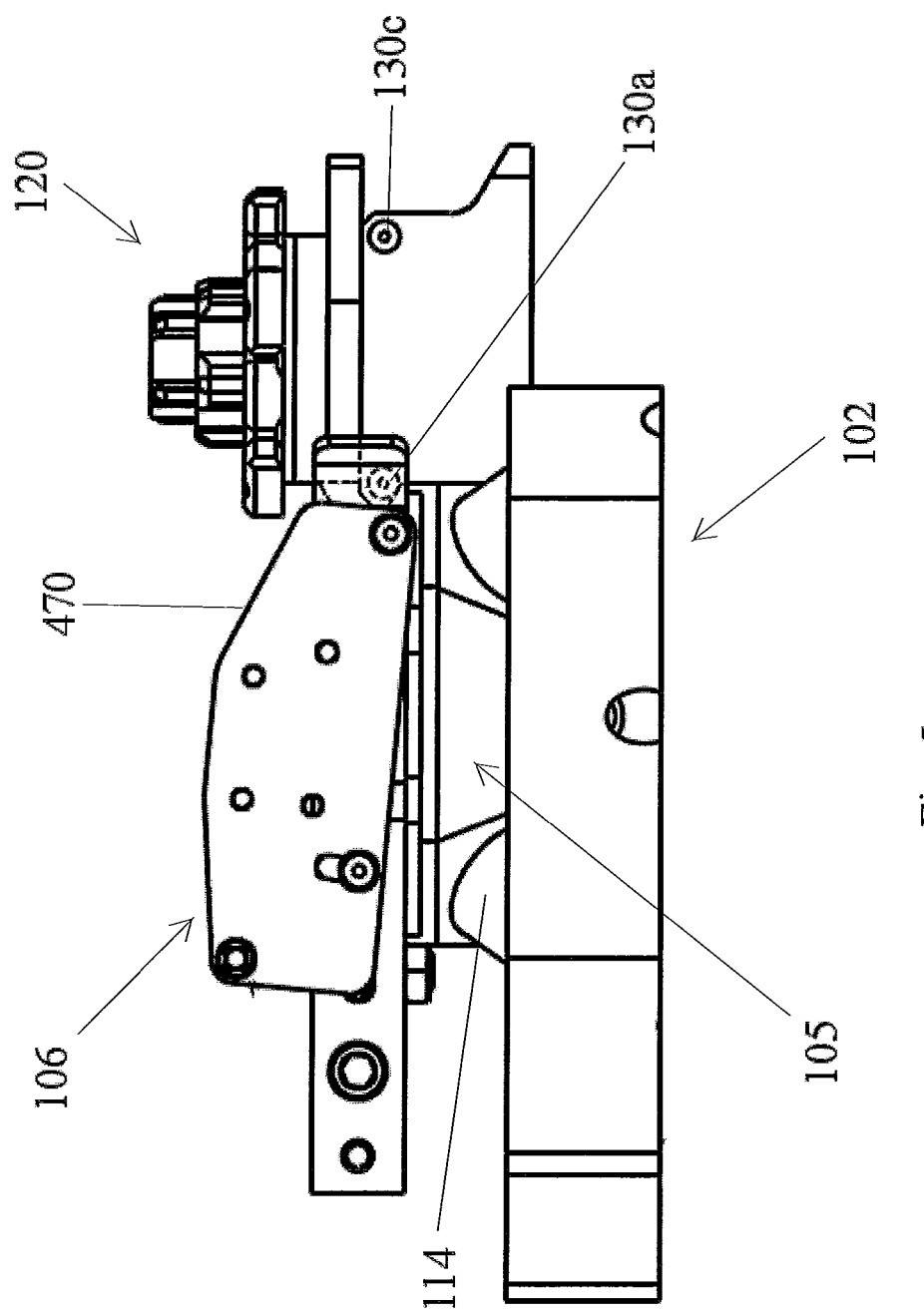
FIG. 5 illustrates a side-perspective view of the tool holder assembly receiving an end effector.

With reference to FIGS. 4 and 5, the tool holder assembly 100 is shown with the tool base assembly 120 of the end effector in position for engagement. With continued reference to FIGS. 4 and 5, pins 130a 130c are shown in slightly different positions between the two figures, indicating the positioning of the tool base assembly 120 of the end effector with relationship to the tool holder assembly 100. However, the tool base assembly 120 of the end effector is not aligned with the tool station 106 in either of FIG. 4 or 5 and compliance to engage is needed. Force from the tool base assembly 120 of the end effector attached to the manipulator (not shown) translated to the tool station 106 causes movement of the upper tool base via the means for compliance 114. The means for compliance 114 thus provide compliance to the tool station, allowing for end effector attachment or detachment.

Figure 9:
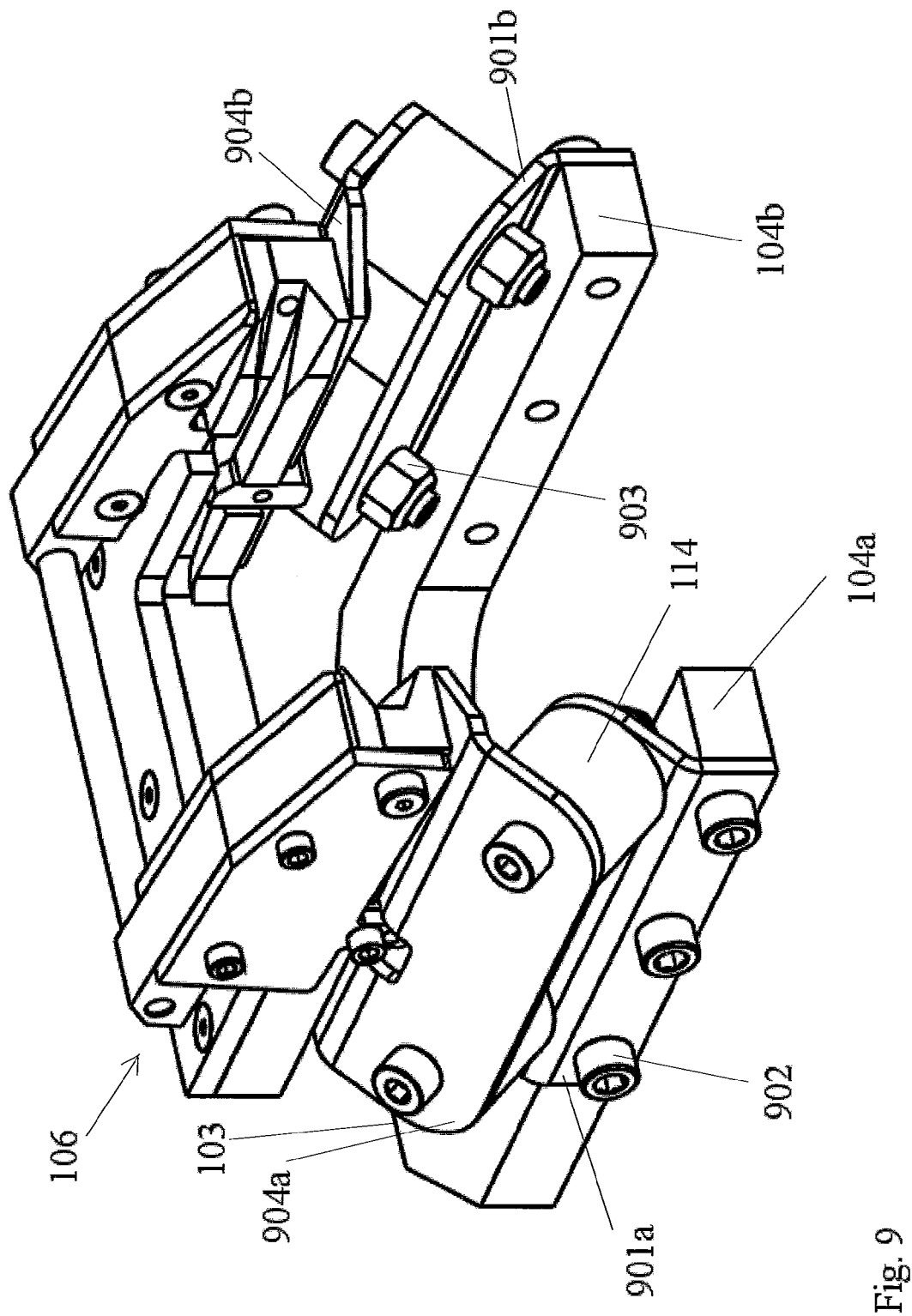
FIG. 9 illustrates an embodiment of the tool holder assembly of the present invention.

With reference to FIG. 9, another embodiment of the compliant tool holder assembly is shown. In this preferred nonlimiting embodiment, lower tool base 102 is substantially u-shaped, having a plurality of parallel arms 104a-104b integral with an end section 103, wherein the arms 104a-104b extend away from the end section 103 and define a cavity. In this embodiment, a plurality of first brackets, 901a-901b are removably attached to the lower tool base 102. In a preferred nonlimiting embodiment, the first brackets are removably attached to the plurality of parallel arms 104a-104b by fasteners 902, said first brackets being angled so that while one section of the bracket is flush with arm 104a of the lower tool base 102, the means for compliance 114 may still be angled relative to both the lower tool base 102 and the tool station 106. In a preferred nonlimiting embodiment, the first brackets are angled at 45 degrees relative to the flat top of the lower tool base 102 such that means for compliance 114 are at an angle of 45 degrees relative to the tool base 102 and the tool station 106. The invention is not limited to one particular fastener, as one skilled in the art could use other fasteners to form a connection.

With continuing reference to FIG. 9, means for compliance 114 are attached to the first brackets 901a-901b with fasteners 903. While the figure displays fasteners with end nuts for securing the mounting means to first brackets, the invention is not limited to one particular fastener, as one skilled in the art could use other fasteners to form a connection. The fasteners 903 pass through the means for compliance 114 and connect the first brackets 901a-901b, the means for compliance 114, and second brackets 904a-904b. Said second brackets 904a-904b are angled such that while they are flush with the means for compliance 114, they may also be flush with the tool station 106, allowing the means for compliance 114 to be at an angle relative to the top of the lower tool base 102 and the bottom of the tool station 106. Sufficient compliance may be achieved with a plurality of means for compliance 114. In a preferred nonlimiting embodiment there are four means for compliance 114 at a 45 degree angle relative to the top of the lower tool base 102 and the bottom of tool station 106; However, sufficient compliance may be achieved with any number of mounting means. Tool station 106 is removably attached to second brackets 904a-904b, allowing tool station 106 to move in translational and rotational degrees of freedom relative to the lower tool base 102, which is rigidly attached to the body of the robot.

As with the lower tool base 102, upper tool base 105, and tool station, brackets 901a-901b and 904a-904b may be made of any suitable material, including Aflas, Buna-N, Butyl, ECH, EPDM, EVA, gum, Ionomer, latex, neoprene, polyethylene foam, polyethylene rubber, polyimide, polyurethane, santoprene, SBR, silicone, vinyl, and Viton® Flouroelastomer. The material may also be a plastics such as ABS, acetal copolymer, acetate, cast acrylic, extruded acrylic, butyrate, Cirlex Polyimide, CTFE, Delrin® Acetal resin, FEP, HDPE Polyethylene, Hydex, Kapton® Polyimide, LDPE polyethylene, polyphenyl oxide, nylon, PEEK, PETG, PFA, polycarbonate, polyester, polypropylene, polystyrene, polysulfone, PPS, PTFE, PVC, PVDF, Radel, Rulon, Teflon® PTFE, polyamide-imide, Tucrite, UHMW polyethylene, VHMW polyethylene, polyetherimide, and Vespel® polyimide. Brackets 901a-901b and 904a-904b may also be injection-molded plastic or metals, such as steel, stainless steel, steel cable, stainless steel cable, titanium, aluminum, or may be composite materials containing fiberglass, carbon fiber, Kevlar, or aramid fibers.

The tool holder assembly 100 can provide different levels of compliance in the six degrees of freedom. Different levels of deflection and stiffness are possible; different degrees of freedom can be provided to account for these. The means for compliance 114 provide maximum deflection in the three translational degrees of freedom. Tilt and yaw rotational degrees of freedom are provided to a lesser extent. The rotational degree of freedom about the axis of the tool has the smallest allowable deflection. It is envisioned that one skilled in the art could provide any number of combinations of deflection orientations using the present invention.

While the present invention has been described in connection with the preferred embodiments, it is to be understood that other similar embodiments may be used or modifications and additions may be made to the described embodiments for performing the same function of the present invention without deviating therefrom. Therefore, the present invention should not be limited to any single embodiment, but rather construed in breadth and scope in accordance with the recitation of the appended claims.

The invention claimed is:

1. An assembly for a compliant tool holder comprising:
a) a lower base comprising a plurality of first parallel arms, wherein said plurality of first parallel arms define a cavity, wherein the plurality of first parallel arms contain a plurality of holes;
b) means for compliance removably attached to said lower base;
c) an upper base comprising a plurality of second parallel arms, wherein said plurality of second parallel arms have an upper surface and a lower surface and contain a plurality of holes for removable attachment of said upper base with said means for compliance; and
d) a tool station removably attached to and positioned above said upper base.

2. The assembly of claim 1, wherein said lower base further comprises a first end section integral with said plurality of first parallel arms.

3. The assembly of claim 1, wherein said lower base is substantially c-shaped.

4. The assembly of claim 2, wherein said lower base is beveled on the surface of the plurality of first parallel arms and first end section adjacent the cavity, and said upper base is beveled on the lower surface of said plurality of second parallel arms, such that said plurality of first parallel arms and said plurality of second parallel arms are at complementary angles to each other.

5. The assembly of claim 1, further comprising a plurality of fastening elements for removably attaching said means for compliance to said upper base and said lower base.

6. The assembly of claim 4, wherein said upper base further comprises a second end section, wherein said plurality of second parallel arms are integral with said second end section and said end section has a top and bottom surface.

7. The assembly of claim 6, wherein said lower base is beveled on the surface of the plurality of first parallel arms and first end section adjacent the cavity, and said upper base is beveled on the lower surface of said plurality of second parallel arms and said bottom surface of said second end section, such that said plurality of first parallel arms and said first end section and said plurality of second parallel arms and said second end section are at complementary angles to each other.

8. The assembly of claim 1, wherein said upper base and said tool station are a single integrated component.

9. The assembly of claim 1, wherein said means for compliance are selected from the group consisting of: shock mounts, vibration mounts, air springs, gas springs, resilient stoppers, and wire rope isolator mounts.

10. The assembly of claim 1, wherein said assembly is removably attached to at least one of the following: a robot, a guided machine, an unmanned vehicle, or any combination thereof.

11. An assembly for a compliant tool holder comprising:
a) a lower base comprising a plurality of parallel arms, wherein the first arms contain a plurality of holes;
b) a plurality of first brackets removably attached to said plurality of parallel arms of said lower base, said first brackets being angled relative to said plurality of parallel arms of said lower base and having a plurality of holes;

c) a plurality of second brackets removably attached to said first brackets, said second brackets being angled relative to said first brackets and having a plurality of holes;
d) means for compliance positioned between said first brackets to said second brackets;
e) a plurality of fastening elements for removably attaching said first brackets to said lower base; and
f) a tool station removably attached to and positioned above said second brackets.

12. The assembly of claim 11, wherein said lower base further comprises an end section integral with said plurality of parallel arms.

13. The assembly of claim 11, further comprising a plurality of fastening elements for removably attaching said second brackets to said means for compliance and said first brackets.

14. The assembly of claim 11, wherein said means for compliance are selected from the group consisting of: shock mounts, vibration mounts, air springs, gas springs, resilient stoppers, and wire rope isolator mounts.

15. The assembly of claim 11, wherein said assembly is removably attached to at least one of the following: a robot, guided machine, unmanned vehicle, or any combination.

* * * * *